Feb. 28, 1961 M. MEREDICH 2,973,044
COMBINATION PLOW AND CUTTING TOOL
Filed Oct. 8, 1957
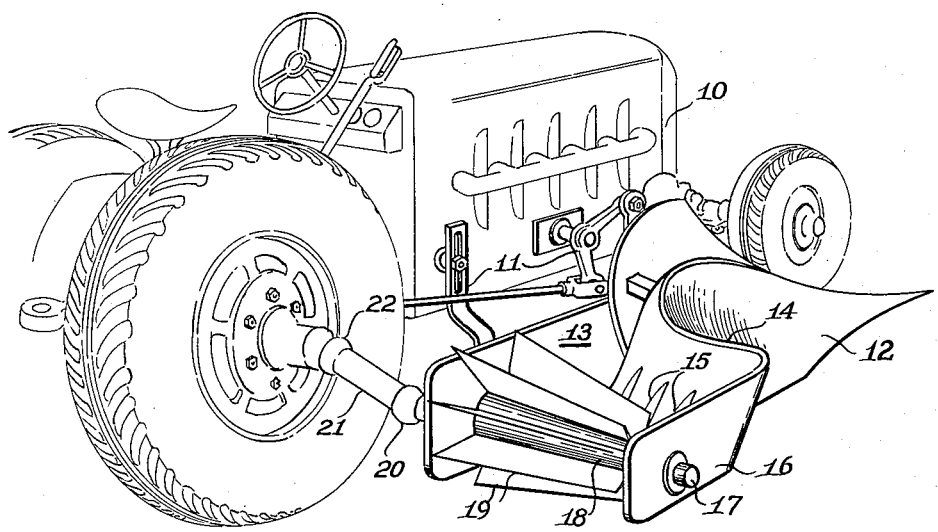
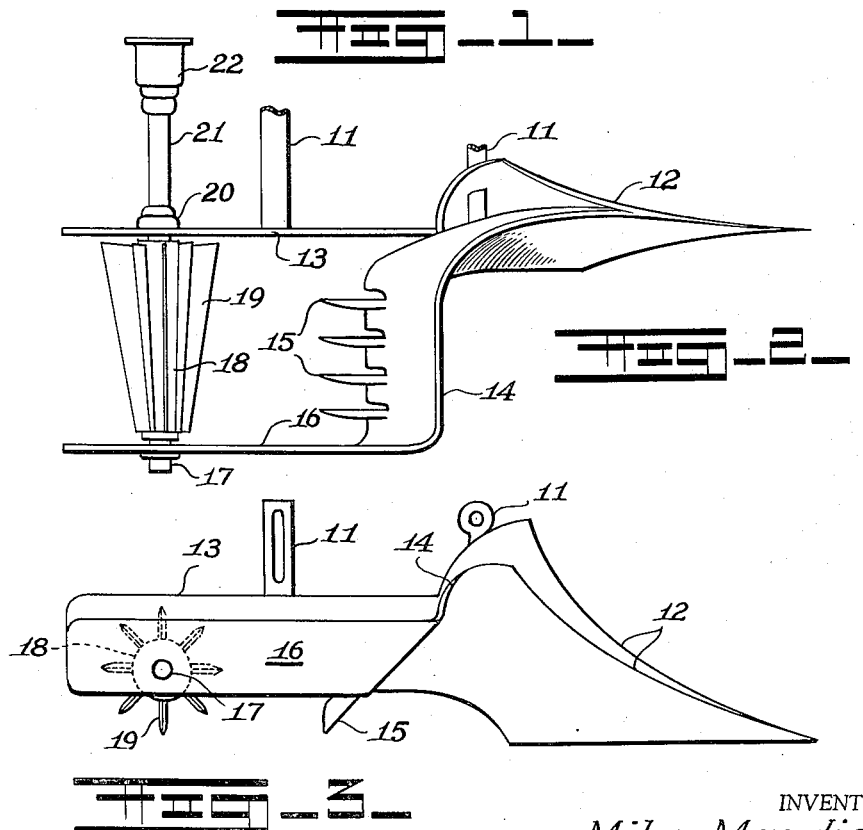
INVENTOR.
Mike Meredich
BY
ATTORNEY.

United States Patent Office 2,973,044
Patented Feb. 28, 1961

2,973,044

COMBINATION PLOW AND CUTTING TOOL

Mike Meredich, 1653 Hartzell Ave., Youngstown, Ohio

Filed Oct. 8, 1957, Ser. No. 688,994

2 Claims. (Cl. 172—67)

This invention relates to a farm implement and more particularly to a combination plow and cutting tool by means of which earth overturned by the plow is cut into small desirable sized portions and rendered suitable for planting.

The principal object of the invention is the provision of a combination plow and cutting tool for rendering soil suitable for planting.

A further object of the invention is the provision of a combination plow and cutting tool adapted to be operated by a tractor in outrigger fashion.

A still further object of the invention is the provision of a plow and cutting tool combination which will, with one passage, condition the soil for planting by turning over a section and dividing that section into a plurality of parallel sections and then cutting the parallel sections into individual pieces.

The combination plow and cutting tool disclosed herein comprises an improvement in the art relating to soil preparation as used in gardening and on farms.

It has heretofore been believed necessary to prepare ground for planting by plowing and subsequently harrowing and discing, by means of which operations the furrows turned by the plow were broken up, smoothed down and the ground made suitable for planting.

The present invention combines the several operations with the unusual quality of handling the soil while it is in its initial plowed state so that the possibility of the furrows being set as by rain or adverse weather conditions is eliminated.

The combination plow and cutting tool disclosed herein has the unique advantage of being pulled by the tractor to which it is attached in outrigger position and at the same time having a rotary portion of the device rotated by the tractor so that a combination action in breaking up the soil through which the device is passed is obtained.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a perspective view of the combination plow and cutting tool attached to a tractor.

Figure 2 is a top plan view of the combination plow and cutting tool.

Figure 3 is a side elevation of the plow and cutting tool.

By referring to the drawing and Figure 1 in particular it will be seen that a tractor 10 is disclosed having outrigger brackets 11—11 secured to the frame thereof and extending outwardly at one side thereof and carrying on their outer ends a plowshare 12 and a supporting arm 13. The plowshare 12 is of conventional size and shape and is adapted to engage the earth in partly embedded relation and to turn a furrow therein as will be understood by those skilled in the art. It will be obvious to those skilled in the art that the mounting brackets 11—11 include vertical adjustment means by which the angle of the plowshare 12 may be controlled.

The plowshare 12 has a sideward extension 14 or moldboard which in turn is slit vertically in its lower portion to form a plurality of blades 15. The blades 15 are positioned at right angles to the sideward extension 14 of the plowshare and a secondary support arm 16 is secured to the sideward extension 14 and extends rearwardly thereof in parallel relation to the support arm 13.

A shaft 17 is journaled in the arms 13 and 16 and carries a rotary cutter 18 thereon having a plurality of blades 19 extending longitudinally thereof and preferably of tapered contour.

A universal joint 20 is connected to the shaft 17 at one end thereof and to a secondary shaft 21 which extends to a coupling 22 which in turn is adapted to be secured to an axle of the tractor 10.

It will thus be seen that when the plowshare 12 is engaged in the ground to be plowed and pulverized so as to render it suitable for planting, the plowshare 12 will turn a furrow, the turned furrow will be immediately engaged by the depending blades 15 and thereby cut into parallel longitudinal sections.

Following such action, the rotary cutter 18 and its blades 19 will engage the parallel longitudinally extending sections of soil and cut the same transversely into a multiplicity of minute portions. The triple action performed by the combination plow and cutting tool will suitably pulverize and level the plowed earth or furrow so that planting may be performed directly therein.

It will thus be seen that the device operates to turn up a furrow of earth, to slit the turned-up earth into a plurality of narrow longitudinally extending sections of earth and finally to cut these sections transversely so as to break up the earth and level it in the final operation.

The angular disposition or contour of the blades 19 is such that the earth that falls back into the plowed area will be reached and cut so that a complete earth plowing and cutting operation is realized.

It will thus be seen that the combination plow and cutting tool disclosed herein meets the several objects of the invention.

Having thus described my invention, what I claim is:

1. The combination of a plow capable of over turning earth and cutting tools operable in the over-turned earth including a plow blade having a pointed front end and a laterally extending moldboard having upper and lower edge portions, a plurality of downwardly extending ground engaging cutting blades secured to the lower edge of the moldboard, a pair of rearwardly extending parallel arms, one of said arms secured to the plow blade, the other of said arms secured to said moldboard respectively, a reel type cutter having a plurality of elongated blades journaled in said arms and disposed therebetween, the elongated blades of said reel cutter extending parallel to the moldboard to engage the earth and cut same transversely after its passage through the cutting blades of said moldboard, mounting brackets attached to and extending from said arm attached to the plow blade and adapted to be engaged on a vehicle and movable means engaging the plow for adjusting the relative position of said plow on said vehicle.

2. The invention as set forth in claim 1, wherein said reel cutter is conical in shape, the base of the cone being proximate the arm secured to the plow blade.

References Cited in the file of this patent

UNITED STATES PATENTS

| | | |
|---|---|---|
| 9,061 | Swartz | June 22, 1852 |
| 902,284 | Ferry et al. | Oct. 27, 1908 |
| 1,485,819 | Shields | Mar. 4, 1924 |
| 1,525,262 | Austin | Feb. 3, 1925 |
| 2,711,125 | Szymczak | June 21, 1955 |

FOREIGN PATENTS

| | | |
|---|---|---|
| 699,571 | France | Feb. 17, 1931 |